(12) United States Patent
Etchegoyen

(10) Patent No.: US 9,571,981 B2
(45) Date of Patent: Feb. 14, 2017

(54) PEDESTRIAN TRAFFIC MONITORING AND ANALYSIS USING LOCATION AND AUTHENTICATION OF MOBILE COMPUTING DEVICES

(71) Applicant: Uniloc USA, Inc., Plano, TX (US)

(72) Inventor: Craig S. Etchegoyen, Plano, TX (US)

(73) Assignee: Uniloc Luxembourg S.A., Luxembourg (LU)

( * ) Notice: Subject to any disclaimer, the term of this patent is extended or adjusted under 35 U.S.C. 154(b) by 0 days.

(21) Appl. No.: 14/049,841

(22) Filed: Oct. 9, 2013

(65) Prior Publication Data
US 2014/0187274 A1      Jul. 3, 2014

Related U.S. Application Data

(60) Provisional application No. 61/746,719, filed on Dec. 28, 2012.

(51) Int. Cl.
| | | |
|---|---|---|
| *H04W 24/00* | (2009.01) | |
| *H04W 4/02* | (2009.01) | |
| *G06Q 30/02* | (2012.01) | |

(52) U.S. Cl.
CPC ......... *H04W 4/028* (2013.01); *G06Q 30/0201* (2013.01)

(58) Field of Classification Search
CPC .............. H04W 4/02; H04W 4/021–4/025; H04W 36/32; H04W 40/20; H04M 1/72572; H04M 3/42229
See application file for complete search history.

(56) References Cited

U.S. PATENT DOCUMENTS

| | | |
|---|---|---|
| 6,151,631 A | 11/2000 | Ansell et al. |
| 7,057,556 B2 | 6/2006 | Hall et al. |
| 7,091,851 B2 | 8/2006 | Mason et al. |
| 7,519,470 B2 | 4/2009 | Brasche et al. |
| 7,826,409 B2 | 11/2010 | Mock et al. |

(Continued)

FOREIGN PATENT DOCUMENTS

| | | |
|---|---|---|
| EP | 2 182 752 | 5/2010 |
| EP | 2 287 820 | 2/2011 |
| WO | WO 2008/055865 | 5/2008 |

OTHER PUBLICATIONS

Martinez et al., "Environmental sensor networks" Computer, IEEE Xplore, vol. 37, Issue 8, Aug. 2004, pp. 50-56.

(Continued)

*Primary Examiner* — Keith Fang
(74) *Attorney, Agent, or Firm* — Sean D. Burdick

(57) ABSTRACT

Numerous mobile devices report their respective locations to a server which collects the location reports to provide real-time pedestrian traffic information, e.g., as a map that shows locations of individual mobile devices. Distribution of mobile devices in a geographic area more closely represents overall population locations and densities. Each device is identified by a digital fingerprint, formed from a number of system and device configuration parameters. Each mobile device is configured to periodically report its location, e.g., at a predetermined time interval and/or whenever the mobile device determines its location for another reason. A known location of a wireless network access point to which a mobile device is connected can serve as an estimated location of the mobile device.

9 Claims, 8 Drawing Sheets

(56) References Cited

U.S. PATENT DOCUMENTS

| | | |
|---|---|---|
| 8,320,938 B2 | 11/2012 | Meyer et al. |
| 8,606,220 B2 | 12/2013 | Soliman et al. |
| 2003/0046022 A1 | 3/2003 | Silverman |
| 2003/0134648 A1 | 7/2003 | Reed et al. |
| 2003/0176196 A1 | 9/2003 | Hall et al. |
| 2003/0222820 A1 | 12/2003 | Karr et al. |
| 2004/0002346 A1 | 1/2004 | Santhoff |
| 2004/0198392 A1 | 10/2004 | Harvey et al. |
| 2005/0070306 A1* | 3/2005 | Kim et al. ............ 455/456.2 |
| 2006/0052115 A1* | 3/2006 | Khushu ............ G01S 5/0263 455/456.3 |
| 2006/0270421 A1* | 11/2006 | Phillips et al. ............ 455/457 |
| 2007/0197229 A1 | 8/2007 | Kalliola et al. |
| 2007/0270164 A1 | 11/2007 | Maier et al. |
| 2008/0085727 A1 | 4/2008 | Kratz |
| 2008/0102957 A1 | 5/2008 | Burman et al. |
| 2008/0155094 A1 | 6/2008 | Roese et al. |
| 2008/0167896 A1 | 7/2008 | Fast et al. |
| 2008/0233956 A1 | 9/2008 | Wyk et al. |
| 2009/0276318 A1 | 11/2009 | Broadbent et al. |
| 2009/0319177 A1 | 12/2009 | Khosravy et al. |
| 2010/0087166 A1* | 4/2010 | Agashe ............ 455/411 |
| 2011/0010245 A1 | 1/2011 | Priebatsch et al. |
| 2011/0196711 A1 | 8/2011 | Craig et al. |
| 2012/0066138 A1 | 3/2012 | Curtis et al. |
| 2013/0036165 A1 | 2/2013 | Tseng et al. |

OTHER PUBLICATIONS

Pottie et al., "Wireless Integrated Network Sensors," Magazine Communications of the ACM CACM Homepage archive, ACM Digital Library, vol. 43, Issue 5, May 2000, pp. 51-58.

\* cited by examiner

PEDESTRIAN TRAFFIC MONITORING AND ANALYSIS USING LOCATION AND AUTHENTICATION OF MOBILE COMPUTING DEVICES

This application claims priority to U.S. Provisional Application No. 61/746,719, filed Dec. 28, 2012, which is fully incorporated herein by reference.

BACKGROUND OF THE INVENTION

1. Field of the Invention

The present invention relates generally to computer data processing and, more particularly, methods of and systems for monitoring and analyzing pedestrian traffic.

2. Description of the Related Art

There are countless occasions and studies in which knowing where people are at any given time is valuable. Some occasions are quite serious. For example, emergency services—such as fire departments and paramedics—need to get to places quickly. If areas of a city are blocked by public gatherings, public demonstrations, or the city's celebration of a sports team winning a national championship, emergency response vehicles can be significantly delayed, sometimes with very serious consequences. In addition, knowing whether and where people are in a burning building is highly valuable information for a fire department.

Analysis of pedestrian traffic patterns can help significantly with urban planning. Knowing where people tend to go within a city can help with planning a mass transit system. Knowing places that people tend to avoid can identify instances of urban blight. And, once the urban blight is removed, knowing how many people tend to go to that location can provide empirical evidence of the efficacy of the blight removal. Monitoring pedestrian traffic can also determine if and how often people enter environmentally sensitive areas.

Businesses also value information regarding where people are and where they go. Knowing approximately how many people are in a store at any given time is valuable. Knowing patterns regarding how many people are in the store at different times of day and different days of the week and during clearance sales and holidays is very valuable. Also valuable is knowing from where people travel to come to the store and what other stores they go to before and after shopping in the store.

What is needed is a way to monitor and analyze pedestrian traffic.

SUMMARY OF THE INVENTION

In accordance with the present invention, numerous mobile devices report their respective locations to a server which collects the location reports to provide real-time pedestrian traffic information. The result can be as simple as a map that shows locations of individual mobile devices. As more and more people own and carry mobile computing devices, such as smart phones, tablet computers, and laptop computers, distribution of mobile devices in a geographic area more closely represents overall population locations and densities.

Real-time pedestrian traffic maps and reports can be used by emergency response vehicles to avoid areas blocked by demonstrations, celebrations, or other mass gatherings that can block various routes. In addition, during mass emergencies such as hurricanes and earthquakes, emergency response personnel can identify locations of large dispossessed populations or can determine whether people are in locations of particular danger.

In addition to reporting real time locations of people in an area, the location reports gathered over time can be statistically regressed to provide information on personal traffic flows. For example, large sporting events can wreak havoc on transportation systems. Tracking individual mobile devices to and from such a large sporting event can provide information regarding how many people travel along which paths to the sporting event, allowing a municipality to modify mass transit or other traffic management systems accordingly. Adapting mass transit to actual, observed human traffic patterns provides optimum service at minimal cost.

Furthermore, commercial interests—particularly retail—benefit from being able to determine a population of customers within a store at any given time and even more so from being able to determine where customers tend to come from before shopping in the retail location and where they tend to go to afterwards.

To ensure privacy and convenience of the individuals, the movement of each is tracked anonymously by monitoring the location of a portable personal computing device. Each device is identified by a digital fingerprint, formed from a number of system and device configuration parameters. Thus, each device can be accurately and securely identified without identification of the person carrying the device.

A client device requests personal traffic information from the server. The request can include a number of attributes of the traffic information requested. For example, for a current, real-time map, the attributes can specify the geographic boundaries of the map. For a map of personal movement over time, the attributes can specify both the geographic boundaries of the map and a range of time over which personal movement is to be mapped. For a statistical regression of personal location data, the attributes include the specifics of the statistical regression to be performed and can also include a format in which the results of statistical regression are to be represented.

Each mobile device is configured to periodically report its location, e.g., at a predetermined time interval and/or whenever the mobile device determines its location for another reason. A known location of a wireless network access point to which a mobile device is connected can serve as an estimated location of the mobile device. The location of the wireless network access point can be roughly determined from other location reports that include locations of respective mobile device that have been connected to the wireless network access point at the time location was reported.

BRIEF DESCRIPTION OF THE DRAWINGS

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. Component parts shown in the drawings are not necessarily to scale, and may be exaggerated to better illustrate the important features of the invention. In the drawings, like reference numerals may designate like parts throughout the different views, wherein:

DETAILED DESCRIPTION

Figure 1:
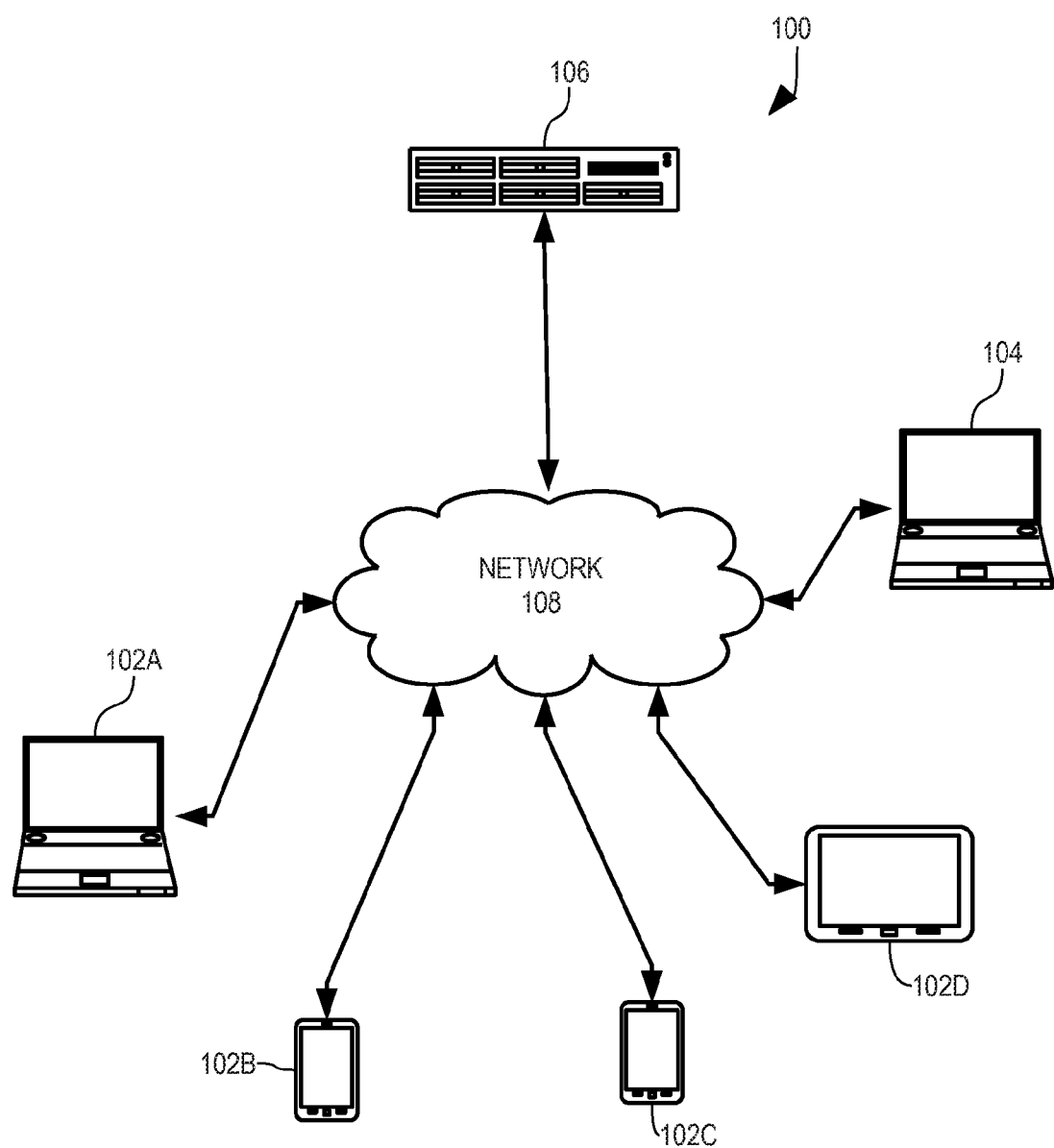
FIG. 1 is a diagram showing a server computer that gathers and analyzes location data from a number of mobile devices through a computer network to provide personal traffic information to a client device in accordance with one embodiment of the present invention.

In accordance with the present invention, a server 106 (FIG. 1) gathers location information from user devices 102A-D, provides instantaneous maps of current pedestrian traffic such as map 200 (FIG. 2), and generates statistical analysis of such location information to provide detailed information regarding typical pedestrian traffic patterns.

Map 200 is a very simple example of a pedestrian traffic map yet provides valuable information. For example, emergency services can immediately see that the Southeast intersection appears to be blocked by pedestrians and can reroute vehicles in response. The number of people using the park can be determined, both those using the park immediately and how many people use the park on average for various days, weeks, months, and seasons. The number of people using the parking garage at the South of map 200 can be determined, both immediate use and usage patterns. The number of people visiting any store location shown on map 200 can be seen. In addition, patterns of pedestrian behavior can be identified, such as how many pedestrians visit a particular sequence of stores vs. other sequences of the same or other stores. Thus, a store manager can determine that a significant number of customers visit her store and then immediate visit a competitor around the block.

User devices 102A-D (FIG. 1) each can be any of a number of types of networked computing devices, including smartphones, tablets, netbooks, laptop computers, and desktops computers, though location information is expected to be more useful for devices that are portable. Each of user devices 102A-D serves as a location proxy for a single user. In other words, the location of each of devices 102A-D is presumed to be the location of a single user. In addition, each of user devices 102A-D communicates with server 106 through a network 108, which is the Internet in this illustrative embodiment. Network 108 can also be a mobile telephony network. User devices 102A-D are analogous to one another and description of user device 102A is equally applicable to user devices 102B-D unless otherwise noted herein. It should also be noted that, while four (4) user devices are shown in this illustrative example, many more than four (4) user devices will report locations to make maps such as map 200 more representative of pedestrian traffic generally.

Client device 104 is a device for which server 106 provides access to pedestrian traffic information such as map 200 (FIG. 2) through network 108.

Transaction flow diagram 300 (FIG. 3) illustrates the reporting by device 102A of its location to server 106.

In step 302, device 102A its globally unique device identifier to server 106 along with data indicating an intent to report the current location of device 102A.

In step 304, server 106 sends a digital fingerprint challenge to device 102A. Digital fingerprints and digital fingerprint challenges are known and described in U.S. Patent Application Publication 2011/0093503 for "Computer Hardware Identity Tracking Using Characteristic Parameter-Derived Data" by Craig S. Etchegoyen (filed Apr. 21, 2011) and that description is incorporated herein in its entirety by reference.

Digital fingerprints offer the advantage of being more stable and less amenable to spoofing that are IP addresses and MAC addresses and, of particular significance here, require no user intervention. Accordingly, location reporting in transaction flow diagram 300 is secure, reliable (no device spoofing), and requires no action on the part of the user.

To avoid frequent communication of digital fingerprints through network 108, device identification and authentication uses only part of the digital fingerprints of user devices 102A-D. A digital fingerprint challenge specifies one or more parts of a digital fingerprint and a manner in which the parts are combined and cryptographically obscured. In addition, the digital fingerprint challenge can change each time device identification and authentication is needed. Accordingly, each time a given device sends its digital fingerprint in response to a different digital fingerprint challenge, the digital fingerprint sent is different. Any digital fingerprint intercepted within network 108 or any network will not authenticate properly if used in response to a different digital fingerprint challenge.

Figure 4:
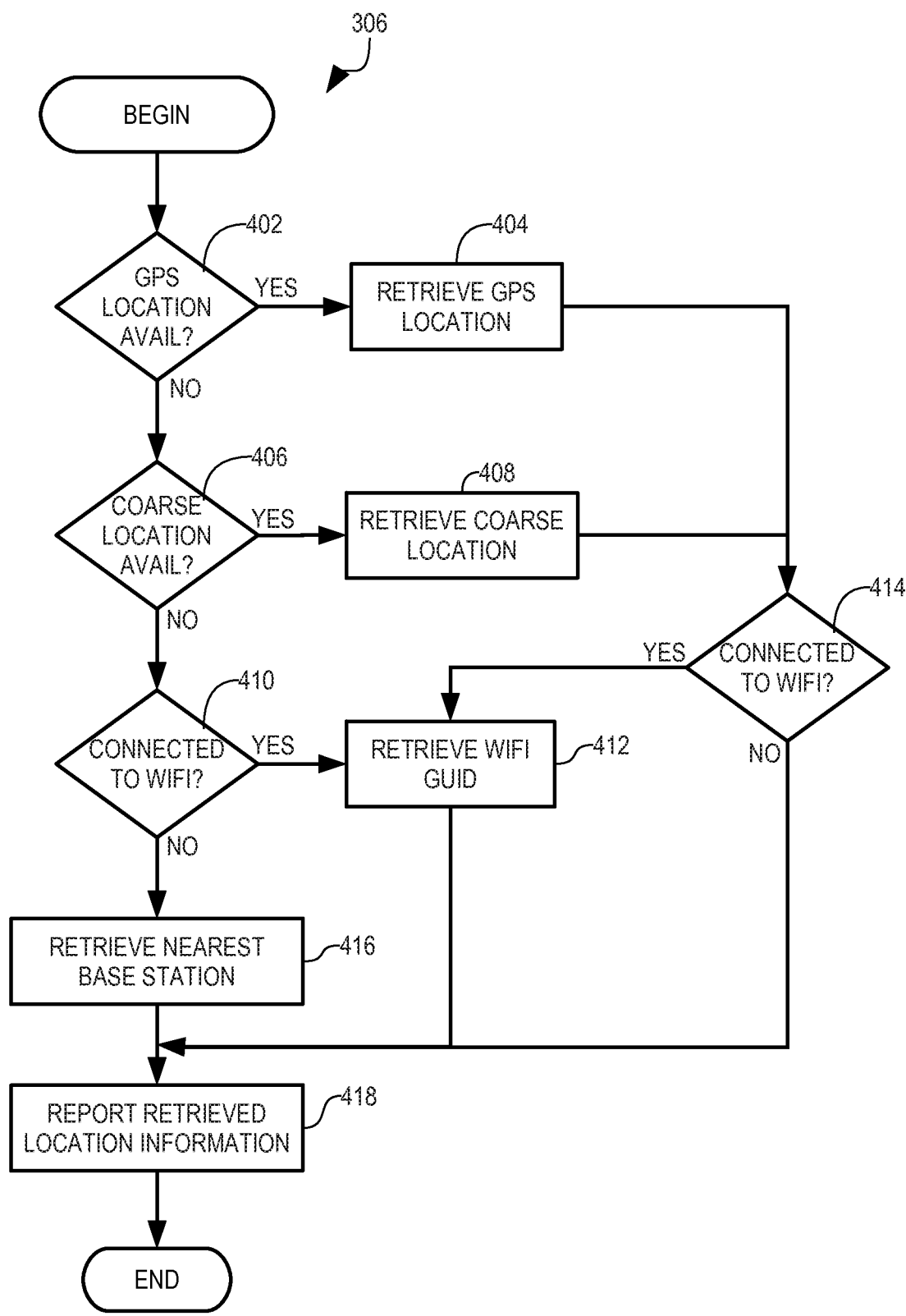
FIG. 4 is a logic flow diagram showing the manner in which a mobile device determines its location in an illustrative embodiment of the present invention.

In step 306, user device 102A determines its geographic location. Step 306 is described in greater detail below in conjunction with logic flow diagram 306 (FIG. 4).

Figure 8:
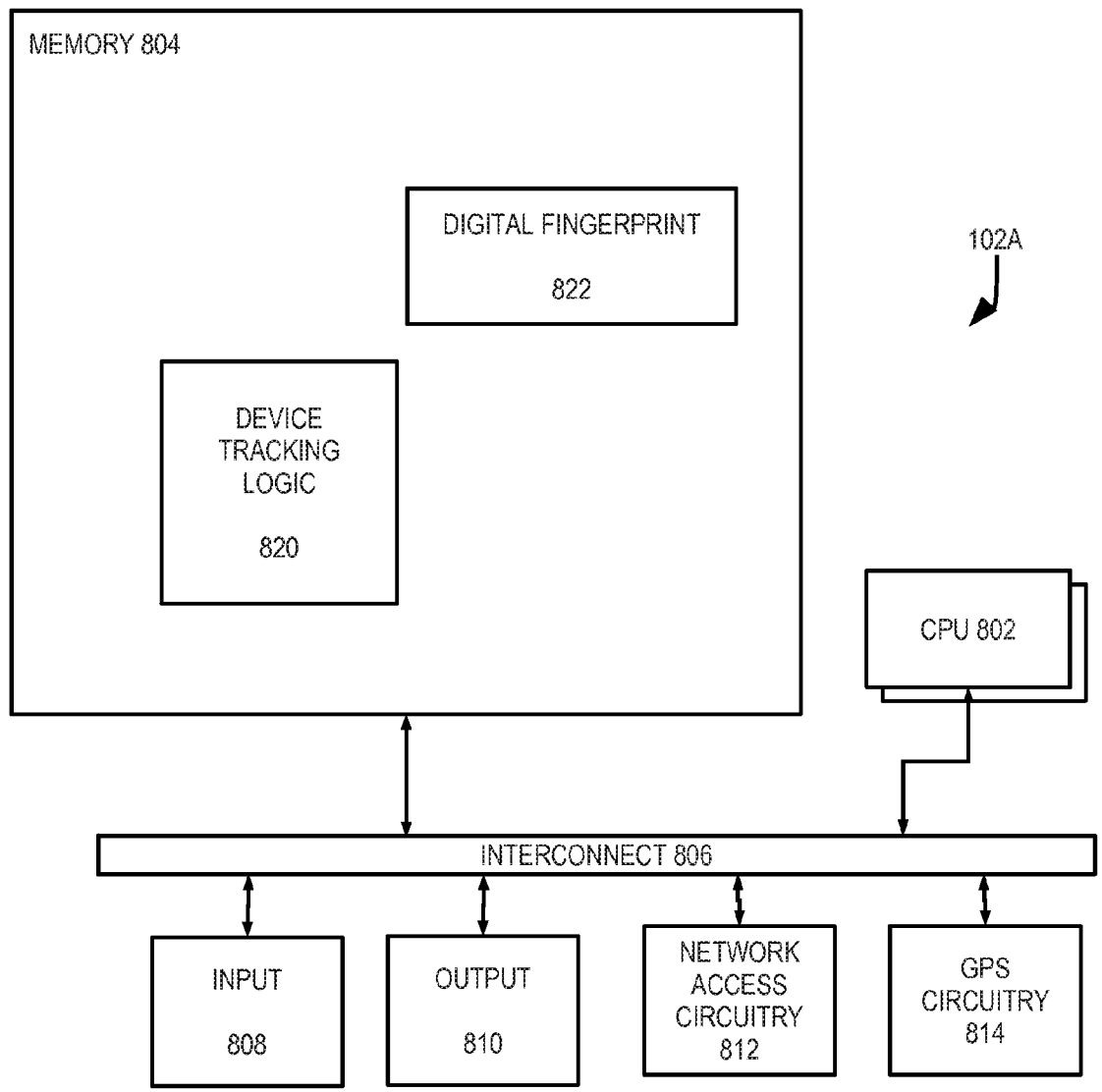
FIG. 8 is a block diagram showing a mobile device of FIG. 1 in greater detail.

In step 308, user device 102A produces a responsive digital fingerprint data using the challenge received in step 304 and digital fingerprint 822 (FIG. 8).

In step 310 (FIG. 3), user device 102A cryptographically combines the responsive digital fingerprint data produced in step 308 with data representing the location of user device 102A determined in step 308. By cryptographically combining the responsive digital fingerprint data and the location data, user device 102A makes the data tamper-evident and obscured.

Figure 10:
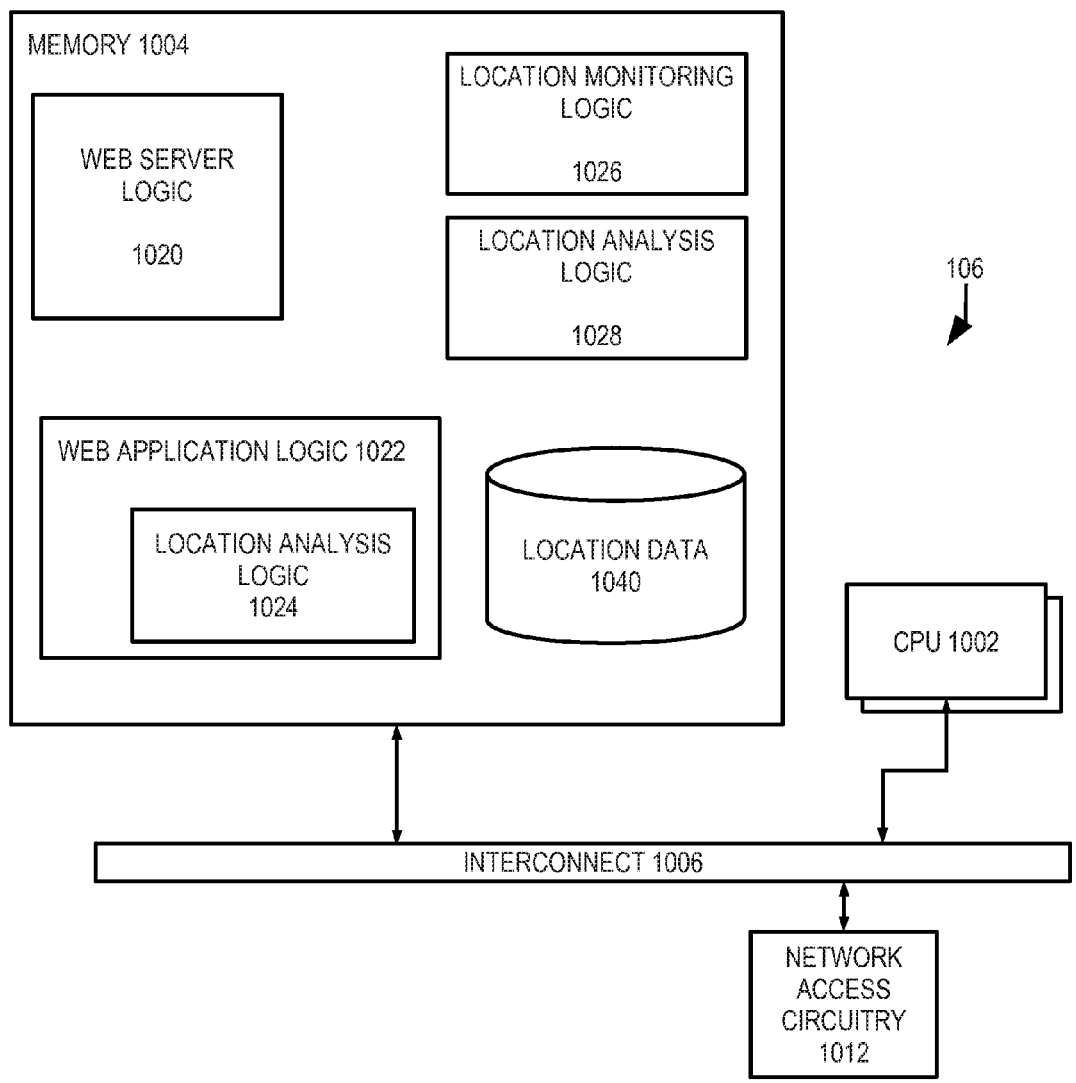
FIG. 10 is a block diagram showing the server of FIG. 1 in greater detail.

In step 312, user device 102A sends the combined data to server 106. In step 314, server 106 parses the responsive digital fingerprint data and location data and stores the location of user device 102A in location data 1040 (FIG. 10).

After step 314 (FIG. 3), processing according to transaction logic diagram 300 completes. In one embodiment, user device 102A is configured to report its location according to transaction logic diagram 300 at regular time intervals. In an alternative embodiment, user device 102A is configured to report its location according to transaction logic diagram 300 in response to a number of triggering events, including for example, determination of the location of user device 102A for reasons independent of reporting of the location to server 106 and connecting to a wireless networking access point. Thus, any time the user of user device 102A uses GPS circuitry of user device 102A resulting in determination of the location of user device 102A, user device 102A reports the location to server 106 in the manner described above.

As described above, step 306—in which user device 102A determines its location—is shown in greater detail as logic flow diagram 306 (FIG. 4). In logic flow diagram 306, priority is given to the most accurate of location data available to user device 102A and data identifying any wireless data network to which user device 102A is included when available to help server 106 in determining the location of devices for which a connected wireless data network is the only location data available.

In test step 402, user device 102A determines whether a GPS (Global Positioning System) location of user device 102A is available. User device 102A may not include GPS circuitry, in which case the GPS location of user device 102A is not available. Even if user device 102A includes GPS circuitry, the GPS location of user device 102A may not be available if the GPS circuitry is disabled or unable to receive adequate signals from GPS satellites.

If the GPS location of user device 102A is available, processing transfers to step 404 in which user device 102A retrieves its GPS location. Otherwise, processing transfers from test step 402 to test step 406.

In test step 404, user device 102A determines whether a coarse location of user device 102A is available. Coarse location of user device 102A can be determined in a number of known techniques involving measurement of distances of user device 102A from a number of wireless telephone network base stations and triangulation. Coarse location of user device 102A may not be available if telephony network circuitry is disabled or unable to receive adequate signals from base stations.

If the coarse location of user device 102A is available, processing transfers to step 408 in which user device 102A retrieves its coarse location. Otherwise, processing transfers from test step 406 to test step 410.

In test step 410, user device 102A determines whether user device 102A is connected to a wireless data network (WiFi) through an access point. If user device 102A is connected to a wireless data network through an access point, processing transfers to step 412 in which user device 102A retrieves a globally unique identifier of the access point and determines a signal strength from the access point. Otherwise, processing transfers from test step 410 to test step 416. The globally unique identifier (GUID) of the access point can be a digital fingerprint of the access point or a canonical combination of readily available information of the access point, such as MAC address and ESSID, for example.

In step 416, user device 102A identifies its nearest wireless telephone network base station.

After either step 404 or step 408, processing by user device 102A transfers to test step 414 in which user device 102A determines whether user device 102A is connected to a wireless data network in the manner described above with respect to test step 410. If user device 102A is connected to a wireless data network through an access point, processing transfers to step 412 in which user device 102A retrieves a globally unique identifier of the access point as described above.

From step 416, step 412, or test step 414 if user device 102A is not connected to a wireless data network through an access point, processing transfers to step 418 in which user device 102A reports the retrieved location information as its best estimate for its location.

Server 106 can estimate the location of user devices 102A-D for which the only location data is a WiFi access point GUID if server 106 can estimate the location of the WiFi access point itself, since WiFi access points have limited range. Accordingly, user device 102A reports any WiFi access point to which user device 102A is connected even if user device 102A can determine its location by a more accurate technique.

Figure 5:
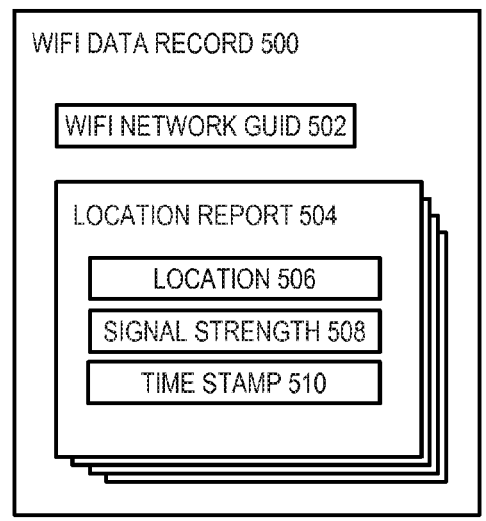
FIG. 5 is a block diagram of a WiFi data record used by the server of FIG. 1 to determine the geographic location of a wireless network access point.

In response to a location report that includes WiFi access point data in addition to location information independent of the WiFi access point data, server 106 stores the location information in a location report 504 (FIG. 5) within a WiFi data record 500 associated with the WiFi access point. WiFi network GUID 502 is the GUID of the WiFi access point, which is sometimes referred to as the subject access point in the context of FIG. 5. Each location report for a user device connected to the subject access point is represented in a location report 504. Location 506 represents the location of the reporting user device. Signal strength 508 represents the signal strength of the subject access point as measured by the reporting user device. Time stamp 510 represents the date and time at which the reporting user device was connected to the subject access point and can be used to determine whether the subject access point has been moved. If locations 506 before a given date and time do not correlate well with locations 506 after the given date and time, it can be determined that locations 506 before the date and time represent a prior location of the subject access point can be disregarded.

When a user device reports its location with only a GUID of a WiFi access point, server 106 estimates the location of the subject access point by finding a center of locations 506 weighted by signal strengths 508. Server 106 uses the weighted center as an estimated location of the reporting user device.

Figure 3:
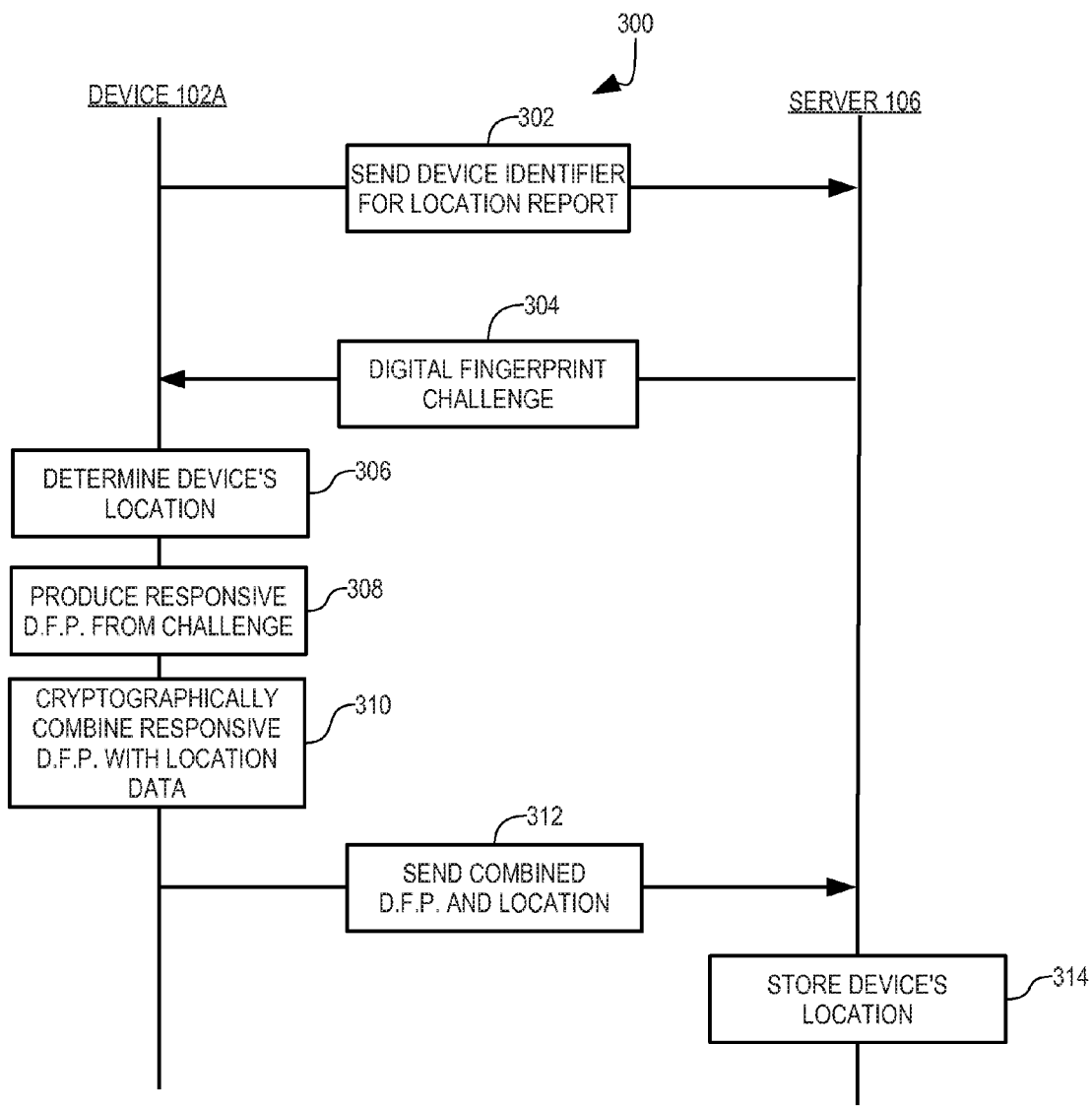
FIG. 3 is a transaction flow diagram showing reporting of current location by a mobile device of FIG. 1.
Figure 7:
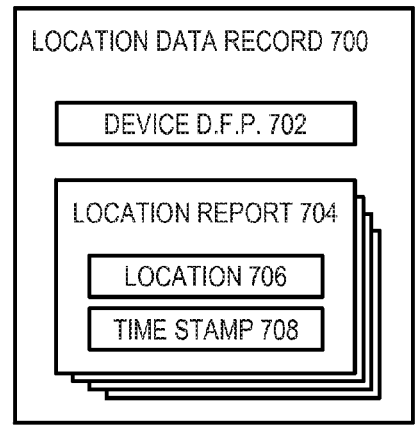
FIG. 7 is a block diagram of a location data record used by the server of FIG. 1 to represent a location report received from a mobile device.

As described above, server 106 stores the location of user device 102A in step 312 (FIG. 3). In particular, server 106 stores the location of user device 102A in a location data record 700 (FIG. 7). Device digital fingerprint 702 is the digital fingerprint by which user device 102A is identified and authenticated. A number of location reports 704 identify the location of user device 102A at a given date and time. Location 706 represents the location of user device 102A, and time stamp 708 represents the date and time.

Figure 6:
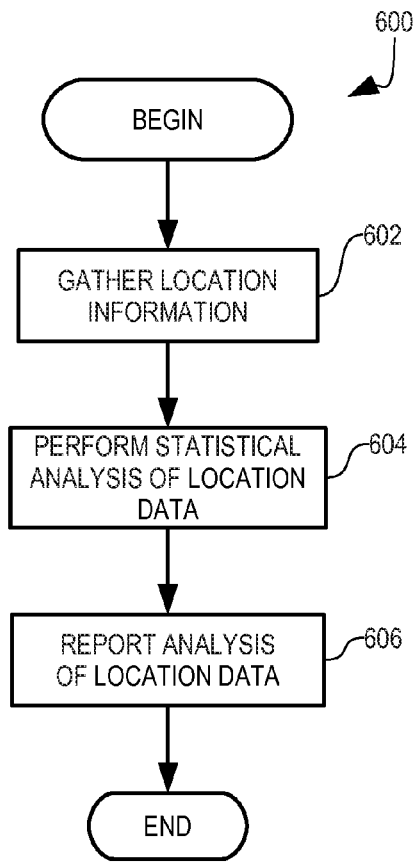
FIG. 6 is logic flow diagram illustrating the processing by the server of FIG. 1 of a request for traffic information.

Logic flow diagram 600 (FIG. 6) illustrates processing by server 106 (FIG. 1) in response to a request for pedestrian traffic information from client device 104. In step 602 (FIG. 6), server 106 gathers location information of numerous location data records 700 (FIG. 7).

In step 604 (FIG. 6), server 106 performs statistical analysis of the location data. For a simple request such as that represented in map 200 (FIG. 2), the statistical analysis can be as simple as gathering all device locations within the geographic boundaries of map 200 and a predetermined recency, e.g., reported within the last twenty (20) minutes. Other statistical analysis can be more complex, involving a variety of statistical regressions and relationships between multiple devices and/or device locations over time.

User device 102A is a personal computing device and is shown in greater detail in FIG. 8. User device 102A includes one or more microprocessors 802 (collectively referred to as CPU 802) that retrieve data and/or instructions from memory 804 and execute retrieved instructions in a conventional manner. Memory 804 can include generally any computer-readable medium including, for example, persistent memory such as magnetic and/or optical disks, ROM, and PROM and volatile memory such as RAM.

Figure 2:
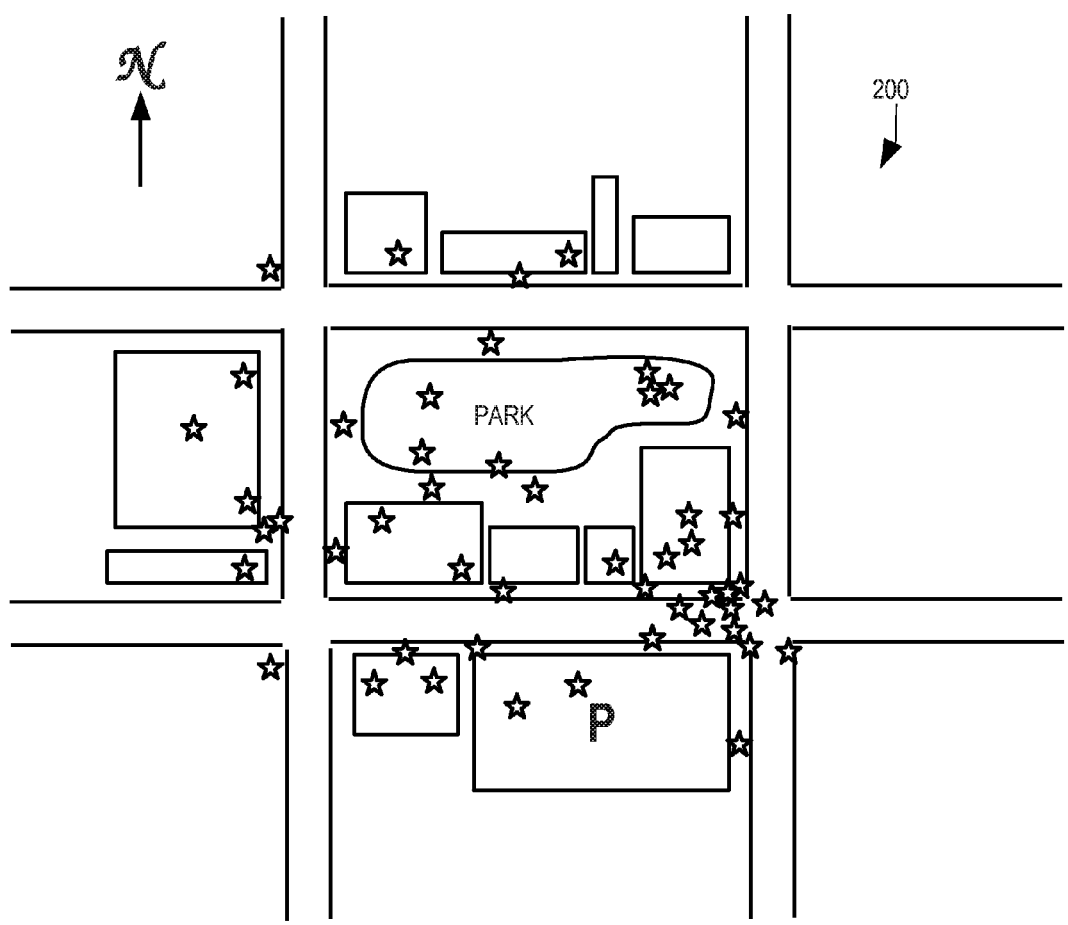
FIG. 2 is a map showing personal traffic information received from the mobile device of FIG. 1.

CPU 802 and memory 804 are connected to one another through a conventional interconnect 806, which is a bus in this illustrative embodiment and which connects CPU 802 and memory 804 to one or more input devices 808, output devices 810, and network access circuitry 812. Input devices 808 can include, for example, a keyboard, a keypad, a touch-sensitive screen, a mouse, a microphone, and one or more cameras. Output devices 310 can include, for example, a display—such as a liquid crystal display (LCD)—and one or more loudspeakers. Network access circuitry 812 sends and receives data through computer networks such as network 108 (FIG. 1). GPS circuitry 814 determines the location of user device 102A in a conventional manner.

A number of components of user device 102A are stored in memory 804. In particular, device tracking logic 820 is all or part of one or more computer processes executing within CPU 802 from memory 804 in this illustrative embodiment but can also be implemented using digital logic circuitry. As used herein, "logic" refers to (i) logic implemented as computer instructions and/or data within one or more computer processes and/or (ii) logic implemented in electronic circuitry. Device tracking logic 820 causes user device 102A to report its location in the manner described above.

Digital fingerprint 822 is persistent data stored in memory 804.

Figure 9:
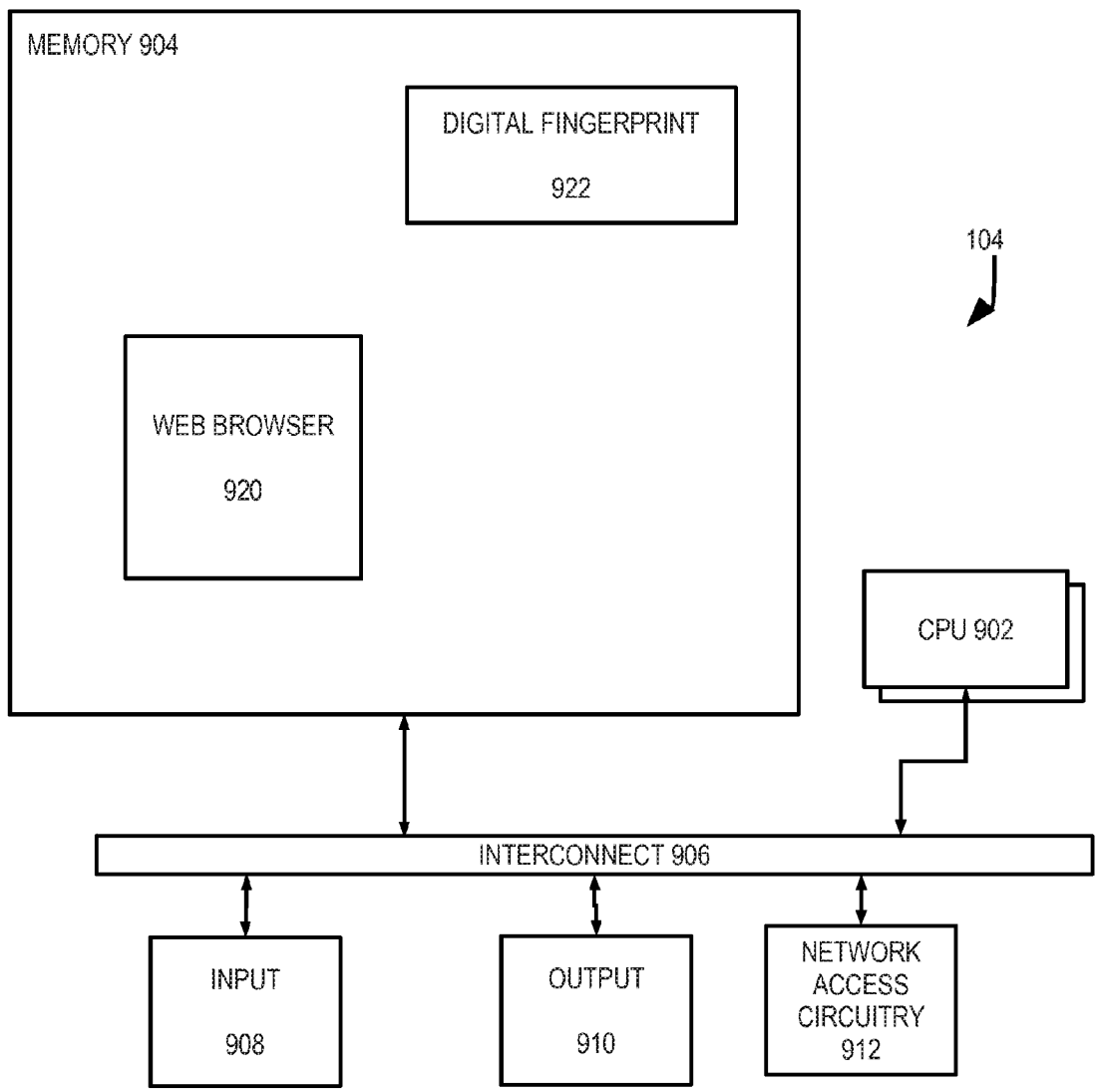
FIG. 9 is a block diagram showing the client device of FIG. 1 in greater detail.

Client device 104 is a personal computing device and is shown in greater detail in FIG. 9. Client device 104 includes one or more microprocessors 902 (collectively referred to as CPU 902), memory 904, an interconnect 806, input devices 908, output devices 910, and network access circuitry 912 that are analogous to CPU 802 (FIG. 8), memory 804, interconnect 806, input devices 808, output devices 810, and network access circuitry 812, respectively.

A number of components of client device 104 (FIG. 9) are stored in memory 904. In particular, web browser logic 920 is all or part of one or more computer processes executing within CPU 902 from memory 904 in this illustrative embodiment but can also be implemented using digital logic circuitry. Web browser 920 is conventional. Digital fingerprint 922 is persistent data stored in memory 904.

Server computer 106 is shown in greater detail in FIG. 10. Server 106 includes one or more microprocessors 1002 (collectively referred to as CPU 1002) that retrieve data and/or instructions from memory 1004 and execute retrieved instructions in a conventional manner. Memory 1004 can include generally any computer-readable medium including, for example, persistent memory such as magnetic and/or optical disks, ROM, and PROM and volatile memory such as RAM.

CPU 1002 and memory 1004 are connected to one another through a conventional interconnect 1006, which is a bus in this illustrative embodiment and which connects CPU 1002 and memory 1004 to network access circuitry 1012. Network access circuitry 1012 sends and receives data through computer networks such as wide area network 104 (FIG. 1).

A number of components of server 106 are stored in memory 1004. In particular, web server logic 1020 and web application logic 1022, including location analysis logic 1024, are each all or part of one or more computer processes executing within CPU 1002 from memory 1004 in this illustrative embodiment but can also be implemented using digital logic circuitry. Location monitoring logic 1026 and location analysis logic 1028 are also each all or part of one or more computer processes executing within CPU 1002 from memory 1004 in this illustrative embodiment but can also be implemented using digital logic circuitry.

Web server logic 1020 is a conventional web server. Web application logic 1022 is content that defines one or more pages of a web site and is served by web server logic 1020 to client devices such as client device 104. Location analysis logic 1024 specifies the behavior of server 106 in providing location analysis services in the manner described above. For example, location analysis logic 1024 provides a user interface through which a user of client device 104 can specify attributes of the statistical analysis of location data desired. In addition, location analysis logic 1024 analyzes location data 1040, invoking location analysis logic 1028 in some embodiments.

Location monitoring logic 1026 specifies the behavior of server 106 in receiving location reports in the manner described above. Location analysis logic 1028 specifies the behavior of server 106 in analyzing location data 1040 in the manner described herein.

Location data 1040 is data persistently stored in memory 1004 and is organized as one or more databases in this illustrative embodiment. Location data 1040 includes WiFi data records such as WiFi data record 500 (FIG. 5) and location data records such as location data record 700 (FIG. 7).

The above description is illustrative only and is not limiting. The present invention is defined solely by the claims which follow and their full range of equivalents. It is intended that the following appended claims be interpreted as including all such alterations, modifications, permutations, and substitute equivalents as fall within the true spirit and scope of the present invention.

What is claimed is:

1. A computer system comprising:
   at least one processor;
   a computer readable medium that is operatively coupled to the processor;
   network access circuitry that is operatively coupled to the processor; and
   location monitoring and assessment logic (i) that executes at least in part in the processor from the computer readable medium and (ii) that, when executed, causes the processor to report traffic information regarding a population of people by performing a method, the method comprising:
   receiving a request for the traffic information from a remotely located client device, wherein the request specifies one or more attributes of the traffic information;
   in response to the request, determining respective locations of two or more computing devices wherein determining includes, for each of the computing devices:
      sending an authentication challenge to the computing device, wherein the authentication challenge specifies one or more parts of a digital fingerprint of the computing device to be provided by the computing device;
      receiving location data and authentication data from the computing device wherein the authentication data is responsive to the authentication challenge, and wherein the location data comprises (i) GPS location data if available, otherwise if GPS location data is not available (ii) coarse location data if available, otherwise if GPS location data and coarse location data are not available (iii) WiFi GUID information if available, otherwise if GPS location data, coarse location data, and WiFi GUID information are not available (iv) wireless telephone network base station identifying information;

comparing the authentication data to predetermined authentication data associated with the computing device; and accepting a location identified by the location data as the respective location of the computing device upon a condition in which the authentication data matches the predetermined authentication data;

preparing the traffic information from the attributes and the locations; and sending the traffic information to the client device.

2. The computer system of claim 1 wherein the traffic information includes a map in which the respective locations of the computing devices within a predetermined recency are represented.

3. The computer system of claim 2 wherein the traffic information includes a statistical regression of the respective locations of the computing devices collected over time.

4. The computer system of claim 3 wherein the respective locations of each of the computing devices are associated with a digital fingerprint of the computing device.

5. The computer system of claim 1 wherein the coarse location data represents an estimate of the location of the computing device from a location of a wireless network access point to which the computing device is connected.

6. The computer system of claim 2 wherein the respective locations of each of the computing devices are associated with a digital fingerprint of the computing device.

7. The computer system of claim 1 wherein the traffic information includes a statistical regression of the respective locations of the computing devices collected over time.

8. The computer system of claim 7 wherein the respective locations of each of the computing devices are associated with a digital fingerprint of the computing device.

9. The computer system of claim 1 wherein the respective locations of each of the computing devices are associated with a digital fingerprint of the computing device.

* * * * *